United States Patent
Kelly et al.

(10) Patent No.: US 12,086,689 B1
(45) Date of Patent: Sep. 10, 2024

(54) SCALABLE QUANTUM PROCESSOR DESIGN

(71) Applicant: Google LLC, Mountain View, CA (US)

(72) Inventors: Julian Shaw Kelly, Santa Barbara, CA (US); Evan Jeffrey, Santa Barbara, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 18/229,071

(22) Filed: Aug. 1, 2023

Related U.S. Application Data (63) Continuation of application No. 17/406,745, filed on Aug. 19, 2021, now abandoned, which is a
(Continued)

(51) Int. Cl.
  *G06N 10/40* (2022.01)
  *B82Y 10/00* (2011.01)
  (Continued)

(52) U.S. Cl.
  CPC ............. *G06N 10/40* (2022.01); *G06N 10/00* (2019.01); *H01L 24/13* (2013.01); *H01L 24/16* (2013.01); *B82Y 10/00* (2013.01); *H01L 25/043* (2013.01); *H01L 25/0657* (2013.01); *H01L 25/074* (2013.01); *H01L 25/0756* (2013.01);
  (Continued)

(58) Field of Classification Search
  CPC ........ G06N 10/00; G06N 10/40; B82Y 10/00; H01L 25/043; H01L 25/06537; H01L 25/074; H01L 25/0756
  See application file for complete search history.

(56) References Cited

U.S. PATENT DOCUMENTS

| 6,911,664 B2 | 6/2005 | Il'ichev |
| 7,932,515 B2 | 4/2011 | Bunyk |
| (Continued) | | |

FOREIGN PATENT DOCUMENTS

| WO | WO 2018/169579 | 9/2018 |
| WO | WO 2018/169585 | 9/2018 |
| (Continued) | | |

OTHER PUBLICATIONS

Arstechnica.com [online], "Bigger is better: Quantum volume expresses computer's limit," May 15, 2017, retrieved on Mar. 2, 2020, retrieved from URL <https://arstechnica.com/science/2017/05/quantum-volume-one-number-to-benchmark-a-quantum-computer/>, 6 pages.

(Continued)

*Primary Examiner* — David A Zarneke
(74) *Attorney, Agent, or Firm* — Fish & Richardson P.C.

(57) ABSTRACT

A device includes: a first chip including a plurality of qubits arranged in an array on a first side of the first chip, in which the array includes a plurality of qubit rows and a plurality of qubit columns, in which the plurality of qubits includes a first qubit row including two or more qubits and a second qubit row including two or more qubits, and in which the second qubit row is directly adjacent to the first qubit row; a second chip bonded to the first chip, in which the second chip has a first side that faces the first side of the first chip; a plurality of qubit control elements; a plurality of qubit readout resonators; and a plurality of qubit readout transmission lines.

13 Claims, 7 Drawing Sheets

Related U.S. Application Data continuation of application No. 16/683,130, filed on Nov. 13, 2019, now abandoned.

(60) Provisional application No. 62/760,485, filed on Nov. 13, 2018.

(51) Int. Cl.
| | | |
|---|---|---|
| *G06N 10/00* | (2022.01) | |
| *H01L 23/00* | (2006.01) | |
| *H01L 25/04* | (2023.01) | |
| *H01L 25/065* | (2023.01) | |
| *H01L 25/07* | (2006.01) | |
| *H01L 25/075* | (2006.01) | |
| *H10N 69/00* | (2023.01) | |

(52) U.S. Cl.
CPC .............. *H01L 2224/13109* (2013.01); *H01L 2224/13116* (2013.01); *H01L 2224/13164* (2013.01); *H01L 2224/13179* (2013.01); *H01L 2224/13183* (2013.01); *H01L 2224/13644* (2013.01); *H01L 2225/06513* (2013.01); *H01L 2225/06531* (2013.01); *H01L 2225/06537* (2013.01); *H10N 69/00* (2023.02)

(56) References Cited

U.S. PATENT DOCUMENTS

| | | |
|---|---|---|
| 9,501,748 B2 | 11/2016 | Naannan |
| 9,882,112 B2 | 1/2018 | Kwon |
| 2007/0174227 A1 | 7/2007 | Johnson |
| 2016/0335558 A1 | 11/2016 | Bunyk |
| 2019/0044047 A1 | 2/2019 | Elsherbini |
| 2019/0044668 A1 | 2/2019 | Elsherbini |
| 2020/0012961 A1 | 1/2020 | Kelly |
| 2020/0058702 A1 | 2/2020 | Kelly |

FOREIGN PATENT DOCUMENTS

| | | |
|---|---|---|
| WO | WO 2019/117949 | 6/2019 |
| WO | WO 2019/117954 | 6/2019 |

OTHER PUBLICATIONS

Kelly, "System engineering of superconducting qubit arrays for Wuantum Supremacy," Presentation at APS March Meeting, Mar. 2018, 44 pages.

Otterbach et al., "Unsupervised Machine Learning on a Hybrid Quantum Computer," https://arxiv.org/abs/1712.05771, Dec. 2017, 17 pages.

Versluis et al., "Scalable quantum circuit and control for a superconducting surface code," https://arxiv.org/abs/1612.08208, Dec. 2016, 9 pages.

SCALABLE QUANTUM PROCESSOR DESIGN

CLAIM OF PRIORITY

This application is a continuation of U.S. patent application Ser. No. 17/406,745, filed Aug. 19, 2021, which is a continuation of U.S. patent application Ser. No. 16/683,130, filed Nov. 13, 2019, which claims priority to U.S. Provisional Patent Application No. 62/760,485, filed Nov. 13, 2018, the contents of which are incorporated here by reference in their entirety.

BACKGROUND

Large-scale quantum computers have the potential to provide fast solutions to certain classes of difficult problems. Multiple challenges in the design and implementation of quantum architecture to control, program and maintain quantum hardware impede the realization of large-scale quantum computing.

SUMMARY

The present disclosure describes technologies for designing a scalable quantum processor.

In general, in some aspects, the subject matter of the present disclosure may be embodied in devices that include a first chip including a plurality of qubits arranged in an array on a first side of the first chip. The array includes a plurality of qubit rows and a plurality of qubit columns. The plurality of qubits includes a first qubit row including two or more qubits and a second qubit row including two or more qubits. The second qubit row is directly adjacent to the first qubit row. The two or more qubits of the first qubit row are offset relative to the two or more qubits of the second qubit row such that qubit columns of the first qubit row are misaligned with respect to qubit columns of the second qubit row. For the first qubit row, a space between each adjacent qubit within the first qubit row bounds a corresponding control region. For the second qubit row, a space between each adjacent qubit within the second qubit row bounds a corresponding control region. The device includes a second chip bonded to the first chip. The second chip has a first side that faces the first side of the first chip. The device includes a plurality of qubit control elements, a plurality of qubit readout resonators, and a plurality of qubit readout transmission lines. At least one qubit control element, at least one qubit readout resonator, at least one qubit readout transmission line, or combinations thereof are on the first side of the second chip. For each control region within the first qubit row a corresponding qubit readout resonator of the plurality of qubit readout resonators is positioned within a footprint of the control region within the first qubit row. For each control region within the second qubit row, a corresponding qubit readout resonator of the plurality of qubit readout resonators is positioned within a footprint of the control region within the second qubit row.

The foregoing and other implementations can each optionally include one or more of the following features, alone or in combination. For example, in some implementations, a first qubit readout transmission line of the plurality of qubit readout transmission lines is arranged to electromagnetically couple to each qubit readout resonator positioned within a footprint of a corresponding control region of the first qubit row, and a second qubit readout transmission line of the plurality of qubit readout transmission lines is arranged to electromagnetically couple to each qubit readout resonator positioned within a footprint of a corresponding control region of the second qubit row.

In some implementations, the first qubit readout transmission line is on the first side of the second chip, the first qubit readout transmission line is positioned directly over at least one co-planar waveguide arm of at least one qubit within the first qubit row, the second qubit readout transmission line is on the first side of the second chip, and the second qubit readout transmission line is positioned directly over at least one co-planar waveguide arm of at least one qubit within the second qubit row.

In some implementations, the device includes a plurality of Purcell filters. The first qubit readout transmission line is arranged to couple to a first Purcell filter of the plurality of Purcell filters, and the second qubit readout transmission line is arranged to couple to a second Purcell filter of the plurality of Purcell filters.

In some implementations, a footprint of each qubit readout resonator of the plurality of qubit readout resonators is non-overlapping with a footprint of each control element of the plurality of control elements.

In some implementations, each qubit readout resonator of the plurality of qubit readout resonators is on the first side of the second chip, each qubit readout resonator positioned within a footprint of a corresponding control region of the first qubit row is directly over the corresponding control region of the first qubit row, and each qubit readout resonator positioned within a footprint of a corresponding control region of the second qubit row is directly over the corresponding control region of the second qubit row.

In some implementations, each qubit of the plurality of qubits includes at least two superconductor islands.

In some implementations, each qubit of the plurality of qubits includes a Josephson junction arranged to electromagnetically couple a first superconductor island to a second superconducting island.

In some implementations, at least two of the at least two superconducting islands have a different size.

In some implementations, a resonance frequency of each qubit of the plurality of qubits is determined by an effective critical current of the qubit, and each qubit of the plurality of qubits is arranged such that a capacitance of the qubit is determined by an area of the superconductor islands and a number of the superconductor islands of the qubit and such that the capacitance of the qubit increases with the area and decreases with the number of superconductor islands.

In some implementations, each qubit of the plurality of qubits includes: a plurality of superconductor islands on a first side of the qubit, a plurality of superconductor islands on a second side of the qubit, and a Josephson junction arranged to electromagnetically couple a superconductor island of the plurality of superconductor islands on the first side of the qubit to a superconductor island of the plurality of superconductor islands on the second side of the qubit. Each superconductor island of the plurality of superconductor islands on the first side of the qubit is arranged to capacitively couple to at least one other superconductor island on the first side of the qubit, and each superconductor island of the plurality of superconductor islands on the second side of the qubit is arranged to capacitively couple to at least one other superconductor island on the second side of the qubit.

In some implementations, each control element of the plurality of control elements includes a respective control line and a respective control contact electrically connected to the respective control line, and, for each qubit of the plurality of qubits, a corresponding control contact is arranged to electromagnetically couple to the respective qubit of the plurality of qubits.

In some implementations, the control contacts of the plurality of control elements are on the first side of the first chip, and the first chip further includes a dielectric layer and a shielding layer covering the dielectric layer, and the dielectric layer defines a plurality of openings through which the control contacts of the plurality of control elements are exposed.

In some implementations, the control contacts of the plurality of control elements are on the first side of the first chip, and each control contact is arranged to couple in-plane to the respective qubit of the plurality of qubits.

In some implementations, each control element of the plurality of control elements is on the first side of the second chip, and, for each qubit of the plurality of qubits, a corresponding control contact is positioned directly over a portion of the respective qubit of the plurality of qubits.

In some implementations, for each qubit of the plurality of qubits, the portion of the qubit over which the corresponding control contact is directly positioned includes a co-planar waveguide arm of the qubit.

In some implementations, each qubit of the plurality of qubits includes at least two superconductor islands, and, for each qubit of the plurality of qubits, the portion of the qubit over which the corresponding control contact is directly positioned includes least two superconductor islands.

In some implementations, the plurality of qubit readout transmission lines and the control lines of the plurality of control elements are on the first side of the second chip, and the second chip further includes a dielectric layer covering the plurality of qubit readout transmission lines and the control lines of the plurality of control elements, and a shielding layer covering the dielectric layer.

In some implementations, the plurality of qubit readout resonators are on the first side of the second chip, and the dielectric layer defines a plurality of openings through which the plurality of qubit readout resonators are exposed.

In some implementations, the control contacts of the plurality of control elements are on the first side of the second chip, and the dielectric layer defines a plurality of openings through which the control contacts of the plurality of control elements are exposed.

In some implementations, each control element of the plurality of control elements includes a vertical connector, each vertical connector extending from the control line of the control element through the dielectric layer to the control contact of the control element.

In some implementations, the control contacts of the plurality of control elements are on the first side of the first chip, and each control contact of the plurality of control elements is electrically connected to a corresponding control line of the plurality of control elements via a corresponding bump bond between the first chip and the second chip.

In some implementations, the plurality of qubit readout resonators are on the first side of the second chip, a first qubit readout transmission line of the plurality of qubit readout transmission lines includes a plurality of coupling regions, each coupling region arranged to electromagnetically couple to a respective qubit readout resonator positioned directly over a corresponding control region of the first qubit row, a second qubit readout transmission line of the plurality of qubit readout transmission lines includes a plurality of coupling regions, each coupling region arranged to electromagnetically couple to a respective qubit readout resonator positioned directly over a corresponding control region of the second qubit row, and the dielectric layer defines a plurality of openings through which the coupling regions of the first qubit readout transmission line and the coupling regions of the second qubit readout transmission line are exposed.

In some implementations, the plurality of readout pads are on the first side of the second chip, each readout pad is arranged to electromagnetically couple to a respective qubit of the plurality of qubits, each readout pad is positioned directly over the respective qubit to which the readout pad is coupled, each readout pad is electrically connected to a respective qubit readout resonator of the plurality of readout resonators, and the dielectric layer defines a plurality of openings through which the plurality of readout pads are exposed.

In some implementations, each qubit within the first qubit row is arranged to electromagnetically couple to at least one other qubit within the second qubit row.

In some implementations, each qubit within the first qubit row is arranged to capacitively couple to at least one other qubit within the second qubit row.

In some implementations, the first chip includes a superconductor ground plane, and each qubit of the plurality of qubits is disposed within a respective cutout of the superconductor ground plane.

In some implementations, the plurality of qubits includes a third qubit row including one or more qubits, the second qubit row is between the first qubit row and the third qubit row, the qubit columns of the first qubit row are aligned with the qubit columns of the third qubit row, and each control region within the second qubit row is bounded by at least one qubit within the first qubit row, at least one qubit within the second qubit row, and at least one qubit within the third qubit row.

In some implementations, the device includes a plurality of bump bonds bonding the first chip to the second chip.

In some implementations, the bump bonds include a superconductor material.

In some implementations, the plurality of qubit readout resonators are on the first side of the first chip, and the first chip includes a dielectric layer and a shielding layer covering the dielectric layer, and the dielectric layer defines a plurality of openings through which the plurality of qubit readout resonators are exposed.

In some implementations, the plurality of qubit readout resonators are on the first side of the first chip, and each qubit readout resonator is arranged to couple in-plane to a respective qubit of the plurality of qubits.

In some implementations, the device includes a superconductor ground plane on the first side of the first chip, and each qubit of the plurality of qubits includes a superconductor island and a Josephson junction, the Josephson junction being arranged to electromagnetically couple the superconductor island to the superconductor ground plane.

Particular embodiments of the subject matter described in this specification can be implemented to realize one or more of the following advantages. To make a quantum processor scalable, the quantum processor can includes unit cells of qubits, for example, rows of qubits, such that the quantum processor can be scaled by including additional unit cells of qubits. To increase processor scaling flexibility, readout and control components for each row of qubits can be routed to fit within a footprint of the group of qubits, such that additional unit cells can be added without new components intersecting existing components. Unit cells can be tiled to allow free extension of the quantum processor in one or more directions. Direct capacitive coupling between qubits provided on adjacent unit cells may be facilitated. Wires (e.g., control lines and qubit readout transmission lines) can be routed to a perimeter of the quantum processor (e.g., to particular edges of each unit cell) to facilitate tiling of the unit cells. Wires can be made to have non-overlapping footprints with one another, such that the wires can be routed in a plane of a chip, as opposed to, for example, in three dimensions out of the plane of the chip.

To further increase processor scaling flexibility, control lines can be routed to not overlap one another. To relax layout constraints, some components can be located on a different chip from a chip on which the qubits are located. To limit interference between components, components can be covered by a dielectric layer and a shielding layer. To increase coupling strength and resonator coherence, control components and readout components can be exposed in some portions of the device, without a covering dielectric layer. To increase the layout area available for other components, qubits in a given unit cell can be read out using a single qubit readout transmission line arranged to couple to a single filter. To achieve single-qubit readout capabilities, resonator frequencies of qubit readout resonators along each qubit readout transmission line can be distinct. To increase the area of control regions in which readout resonators can be placed, qubits can be made up of multiple superconductor islands. To decrease losses, qubits can be directly couplable to one another.

The details of one or more implementations are set forth in the accompanying drawings and the description below. Other features and advantages will be apparent from the description and drawings, and from the claims.

DETAILED DESCRIPTION

The present disclosure relates to a quantum processor. In particular, this disclosure describes a quantum processor including a qubit array and control regions bounded by qubits.

In quantum processor design, performance considerations place constraints on the layout of the processor components. When a quantum processor includes two chips that are bonded together such that components on respective sides of the two chips face each other, the design of each processor component and the relative positions of the processor components can determine performance.

Design constraints may be accounted for when scaling a quantum processor to include additional qubits. Additional qubits, control elements, qubit readout resonators, and other components can be positioned to account for the existing components. Quantum processors may be designed using a unit cell-based approach (e.g., where a unit cell corresponds to a row or a column of a qubit array), such that the processor can be scaled by incorporating additional unit cells. Qubits in each unit cell can bound control regions. The unit cells may be designed so that layout constraints are comparatively easy to satisfy. While examples disclosed herein refer to rows, this disclosure may be broadly understood to apply to unit cells of qubits generally.

Various design elements may enable the unit cell-based quantum processor design. Forming a qubit out of two or more superconductor islands can allow larger control regions bounded by the qubits, while also maintaining target qubit capacitances and direct qubit-to-qubit coupling in a qubit array (including between qubits in adjacent unit cells). A single qubit readout transmission line, with a single filter, can be arranged to couple to all the qubit readout resonators in a given row. The qubits can be formed on a first chip and other components formed on a second chip, and dielectric and shielding layers can be incorporated into the second chip. The dielectric and shielding layers can define openings through which portions of the control elements, qubit readout transmission lines, and qubit readout resonators are exposed. Control lines and qubit readout transmission lines can be routed to minimize cross-talk and interference. Control elements and qubit readout resonators can be made non-overlapping with the qubits.

These and other design elements can facilitate tiling of unit cells, for example, tiling of unit cells in a column of unit cells. Control components and readout components used to control and read out each unit cell can be confined to a footprint of the unit cell, such that additional unit cells and associated control and readout components can be placed without footprints of the additional unit cells overlapping footprints of existing unit cells or footprints of existing control and readout components. In some examples, an arbitrary number of unit cells can be tiled in one direction.

Figure 1:
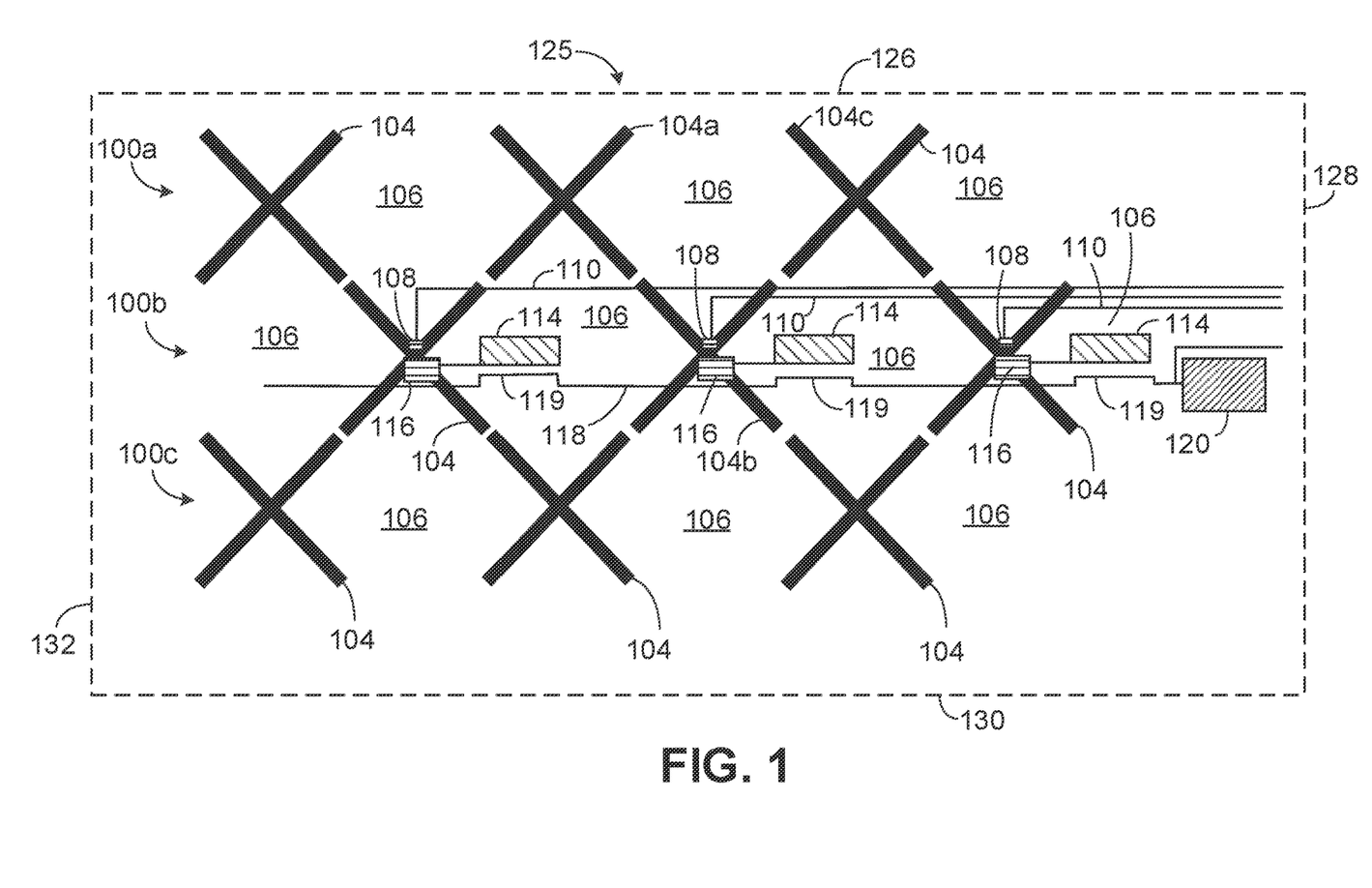
FIG. 1 is a schematic showing an exemplary qubit array and associated control and readout components.

In the example of FIG. 1, a quantum processor 125 includes a qubit array that includes multiple qubit rows (e.g., three qubit rows 100*a*, 100*b*, 100*c*). Each qubit row 100 contains multiple qubits (e.g., three qubits 104), and the qubits 104, along with qubits 104 from adjacent qubit rows 100, bound control regions 106. Each control region 106 is bound in part by adjacent qubits within the qubit row containing the respective control region 106. Adjacent qubits (for example, 104*a* and 104*b*) from adjacent rows can couple to each other during operation of the quantum processor, e.g., through direct capacitive coupling. For instance, in the example of FIG. 1, each qubit 104 is an Xmon type qubit having four separate co-planar waveguide arms. Adjacent qubits 104 may capacitively couple to one another through their co-planar waveguide arms.

Qubits 104 in adjacent qubit rows 100 are offset relative to each other, such that qubit columns of adjacent qubit rows 100 are misaligned with respect to one another. In the example of FIG. 1, respective qubit columns of qubit rows 100*a* and 100*c* are aligned with one another, and qubit columns of qubit row 100*b* are misaligned with qubit columns of 100*a* and 100*c*.

The qubits 104 are on a first side of a first chip. The quantum processor 125 also includes a second chip bonded to the first chip such that a first side of the second chip faces the first side of the first chip. Non-qubit components including control elements 107, qubit readout resonators 114, and qubit readout transmission lines 118 can be on either the first chip or on the second chip or on both the first chip and the second chip. Further details on the two-chip configuration can be found below in reference to FIGS. 5A-5B and FIGS. 6A-6C.

Each control region 106 has a footprint that encompasses portions of both the first chip and the second chip. On the first chip, the footprint of each control region 106 is the spatial extent of each control region, or, equivalently, the area bounded by the qubits defining each control region. The footprint on the first chip extends through a depth of the first chip. On the second chip, the footprint of each control region is the area of the second chip that is directly over the footprint of the control region on the first chip when the two chips are bonded together. The footprint on the second chip extends through a depth of the second chip.

"Overlap" refers at least to respective footprints of two components sharing common area. For example, if a first component on a first chip is directly over a second component on a second chip, the two components have overlapping footprints. For example, if a first component is on a surface of a first chip, and a second component is beneath the first component on the first chip such that the respective footprints of the two components share common area (for example, if a first wire on the surface of the first chip has an intersecting path with a second wire buried in the first chip, as viewed along an axis orthogonal to the surface of the first chip), then the two components can be said to have overlapping footprints.

"Directly over" refers at least to two components or two areas facing each other when the two chips are bonded together, the two components or two areas being directly across from one another along an axis orthogonal to the first side of each of the two chips. "Directly over" includes at least situations in which components or areas are only partially directly over one another, for example, in which only a portion of a first component is directly over only a portion of a second component.

Other components, or sets of components, can also have footprints. For example, for a qubit readout resonator on the second chip, the footprint of the qubit readout resonator on the second chip is the spatial extent of the qubit readout resonator, and the footprint of the qubit readout resonator on the first chip is the area on the first chip that is directly over the spatial extent of the qubit readout resonator on the second chip.

The quantum processor 125 includes control elements 107 that are couplable to the qubits 104 within each qubit row 100. As described in more detail below, each control element 107 can be, for example, an XY-control element or a Z-control element, and can be used to provide coherent control of the state of the respective qubit 104. Each control element 107 includes a control contact 108 that is arranged to electromagnetically couple to a respective qubit 104. In some examples, each control contact 108 is on the second chip and is positioned directly over the respective qubit 104. Each control element 107 can also include a control line 110 that is electrically connected to the control contact 108 of the control element 107. Note that, for clarity, control elements 107 are shown in FIG. 1 only in the qubit row 100b, though control elements 107 for other qubits within other qubit rows also may be provided.

Qubit readout resonators 114 are positioned within the footprints of the control regions 106. In some examples, the qubit readout resonators 114 are on the second chip and are positioned directly over the control regions 106. In some examples, the qubit readout resonators 114 are on the first chip. Each qubit readout resonator 114 is arranged to electromagnetically couple to a respective qubit 104 via a readout pad 116. In some examples, the readout pad 116 is on the second chip and is directly over a portion of the respective qubit 104. In some examples, the readout pad 116 is on the first chip adjacent to the respective qubit 104.

The qubit readout resonators 114 arranged to couple to qubits 104 within a single row 100 are all arranged to electromagnetically couple to a single qubit readout transmission line 118 that can be arranged to couple to, for example, a filter 120, such as a Purcell filter. Coupling regions 119 (described in more detail below in reference to FIGS. 6A-6C) are configured to couple the qubit readout transmission line 118 to the qubit readout resonators 114. Note that, for clarity, a qubit readout transmission line 118 is shown in FIG. 1 only in the qubit row 100b, though qubit readout transmission lines 118 for other qubits within other qubit rows also may be provided.

When this disclosure refers to components being "coupled" or "coupling" to one another, or when this disclosure refers to components being "arranged to couple" to one another, the disclosure is including at least situations in which two components are arranged to be couplable to one another, even if the components are not always coupled to one another, and even if the components are only coupled during use of the quantum processor. For example, a qubit readout transmission line may be said to be electromagnetically coupled to a qubit readout resonator, meaning, for example, that under certain conditions (for example, when below a superconducting critical temperature, or when subject to a pulse at a certain frequency) the qubit readout transmission line electromagnetically couples to the qubit readout resonator.

"Coupled" or "coupling" or "arranged to couple" may also include at least situations in which components are configured to be couplable to one another, for example, in which a first component is configured to have a characteristic frequency, or configured to be tunable to have a characteristic frequency, that matches a characteristic frequency of a second component. "Coupled" or "coupling" or "arranged to couple" may include aspects of both the relative positions of two components and the internal design of each component. Relative positions may include, for example, having the two components near to each other on one chip, or having the first component on a first chip be directly over the second component on a second chip. Internal design of each component may include, for example, a resonance frequency of each component, a shape of each component, and a material of each component. Components are arranged to couple subject to the coupling strength and quality design requirements of the quantum processor.

Because the components used to control and read out the state of each qubit 104 of each row 100 can be entirely or substantially within a footprint of each qubit row 100, the quantum processor 125 may be scalable by expanding the quantum processor 125 to include additional qubit rows 100 and associated components. Control lines 110 and qubit readout transmission lines 118 can be routed so that the lines are not within the footprints of other qubit rows 100 of the quantum processor 125. For example, in FIG. 1, the three qubit rows 100a, 100b, 100c share two opposite edges 128 and 132, while edges 126 and 130 bound, respectively, another edge of qubit row 100a and another edge of qubit row 100c. Control lines 110, qubit readout transmission lines 118, and other wires associated with each qubit row can enter and/or exit each qubit row via the edges 128 and 132. Edges 126 and 130 are left available for placement of additional qubit rows and associated readout and control components such that footprints of the additional qubit rows would not intersect with the control lines 110, qubit readout transmission lines 118, and other wires associated with the existing qubit rows 100a, 100b, 100c, those lines and wires being routed to, for example, a periphery of a chip on which the lines and wires are formed.

Because the control lines, qubit readout transmission lines, and other wires associated with the qubit rows can enter and/or exit the qubit rows via the edges 128, 132 that have qubit rows on only one side (for example, a left side of edge 128 and a right side of edge 132 in FIG. 1), the edges 128, 132 are available for wire routing even after potential tiling of additional qubits at the other edges 126, 130. Therefore, wires can be routed via the edges 128, 132 without a need for, for example, 3D routing of wires in or out of a plane of the first chip or the second chip. Each wire can be routed in a respective single plane, or substantially in a respective single plane, from the edges 128, 132 to any component to which the wire is arranged to be coupled or connected.

Although the example of FIG. 1 includes three qubit rows and three qubits in each qubit row, the number of qubit rows and the number of qubits within each qubit row can be lower than three or higher than three. Although the example of FIG. 1 includes a single control element coupled to each qubit, a qubit can be coupled to two or more control elements, for example, an XY-control element and a Z-control element. Although FIG. 1 shows a discrete filter 120 coupled to the qubit readout transmission line 118, the filter 120 can be integrated into an entire length of the qubit readout transmission line 118, or the filter 120 can include multiple sections of meandering wires positioned along different parts of the qubit readout transmission line 118.

Control lines from qubits on a first side of a qubit row can extends towards a first edge of the qubit row, and control lines from qubits on a second side of the qubit row can extend towards a second edge of the qubit row. For example, a control line arranged to electromagnetically couple to qubit 104a can be routed in and/or out of the qubit row 100a via the edge 132, while a control line arranged to electromagnetically couple to qubit 104c can be routed in and/or out of the qubit row 100a via the edge 128.

Unit cells, for example, rows 100a, 100b, 100c, can be rotated or offset in relation to each other. Unit cells can differ from each other in, for example, a position of each component and/or a resonance frequency of each component.

Figure 2:
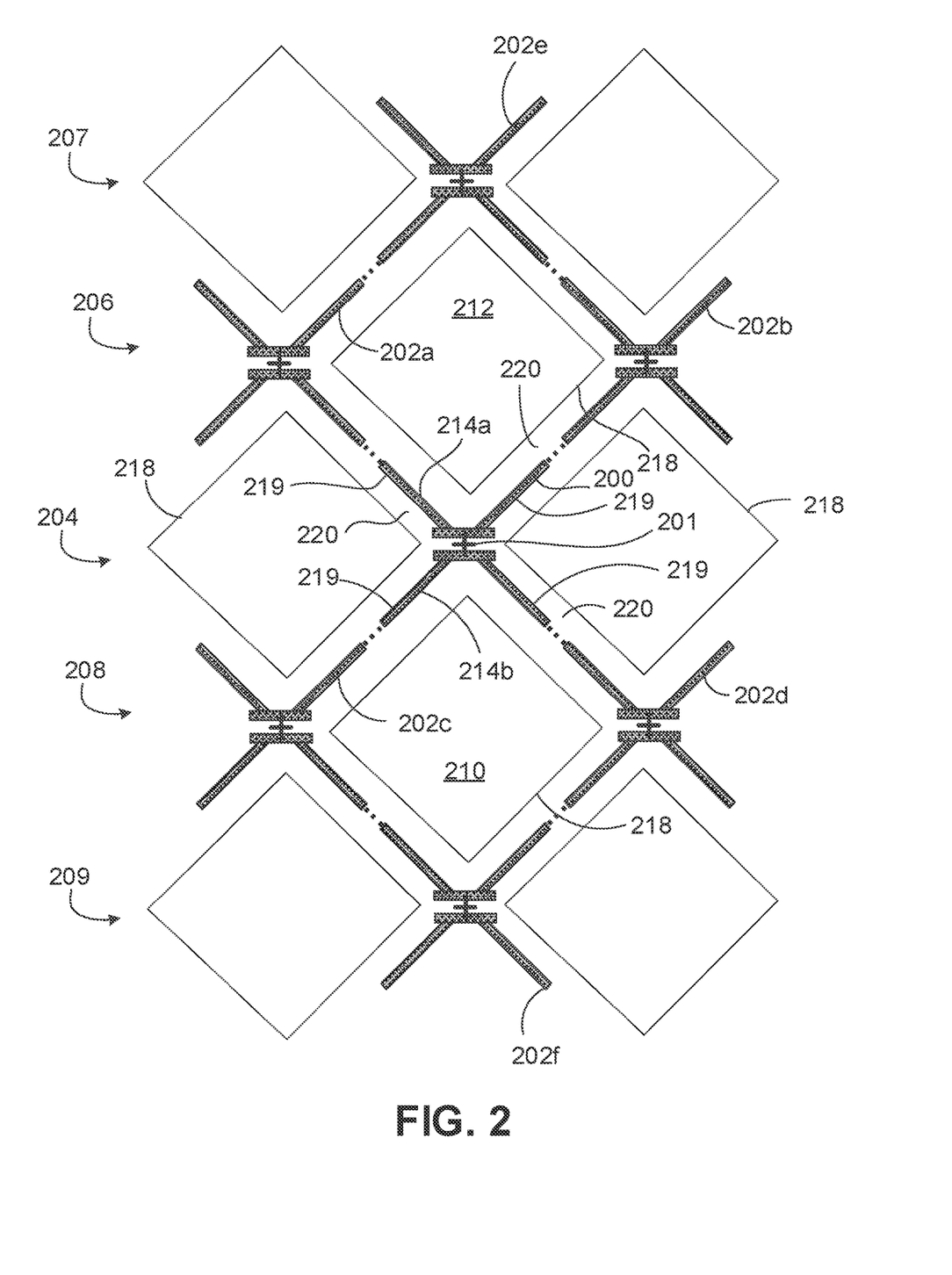
FIG. 2 is a schematic showing an exemplary set of coupled qubits.

FIG. 2 shows a qubit 200 of a first qubit row 204 arranged to couple to four qubits 202a, 202b, 202c, 202d of qubit rows 206, 208. Qubits 202e and 202f are included in qubit rows 207 and 209, respectively (other components of the qubit rows 204, 206, 207, 209 are not shown). Qubits 200, 202c, 202d, and 202f bound a first control region 210, and qubits 200, 202a, 202b, and 202e bound a second control region 212. Qubit-to-qubit couplings are indicated by dashed lines.

The qubits can be superconducting qubits, for example, transmon qubits or Xmon qubits. In the example of FIG. 2, the qubit 200 includes a Josephson junction 201 coupling two superconductor islands 214a, 214b. In some examples, the qubits can also include more than two superconductor islands, or, as shown in FIG. 1, each qubit can include only one superconductor island. The qubit 200 is surrounded by a superconductor ground plane 218 and separated from the ground plane 218 by a gap 220 shown in white in FIG. 2. The qubit 200 can include, for example, co-planar waveguide arms 219. The gap 220 may correspond to regions where, for example, the superconductor ground plane 218 has been removed to expose a portion of a substrate on which the qubit is formed. Each superconductor island can be disposed within a cutout of the superconductor ground plane.

An area of each of the control regions 210, 212 is defined by a size of the qubits defining the control region and by a distance between those qubits. As described above, qubit readout resonators can be positioned within the footprints of the control regions 210, 212, for example, on the second chip directly over the control regions 210, 212, and such a configuration may depend on the areas of the control regions 210, 212. For example, each qubit readout resonator might have a size limited by an area of a corresponding control region.

One approach for increasing the area of the control regions 210, 212 may be to introduce coupling resonators or buses between qubits—for example, between qubits 200 and 202a—to increase a distance between the qubits. This increases the area of the control region 212 that is enclosed by qubits 200, 202a, 202b, 202e and is free of qubits. In this approach, the qubits 200 and 202a couple indirectly to each other through the additional resonators or buses, which may lead to additional losses or qubit errors.

Instead of, or in addition to, coupling indirectly, qubits can couple directly. The coupling can be, for example, an electromagnetic coupling. The coupling can be a capacitive coupling. The space separating, for example, qubits 200 and 202a can be free of an intermediate coupling element. Qubits can be electrically insulated from each other. A degree of capacitive coupling between qubits can be determined substantially by a distance separating the qubits. Because a degree of qubit-to-qubit coupling that is too high might induce undesired qubit state interference, and because a degree of qubit-to-qubit coupling that is too low might prevent quantum processing from proceeding, a particular target degree of capacitive coupling, and therefore a particular target distance separating coupled qubits, may be desirable.

In order to achieve direct coupling between qubits, with a target distance between qubits, while maintaining or increasing the areas of the control regions 210, 212, the sizes of the qubits defining the control regions 210, 212 can be increased. However, the size of each qubit can determine a respective (total or effective) capacitance of each qubit. It may be desirable to maintain a target total capacitance of each qubit. This may be at least because the total capacitance may be associated with target qubit specifications, for example, an error rate, relaxation time, resonance frequency, or degree of direct coupling between qubits.

In some examples of the present disclosure, each of the qubits can be arranged such that the capacitance of each of the qubits is effectively determined by an area of the superconductor islands and a number of the superconductor islands of each of the qubits. As shown in FIG. 2, qubit 200 includes two superconductor islands 214a, 214b. For example, each of the qubits can be arranged such that the capacitance of each of the qubits increases with the area and decreases with the number of superconductor islands. A qubit can include two sides, each side including multiple superconductor islands that are arranged to capacitively couple to one another. A superconductor island from a first side can be coupled to a superconductor island on a second side by a Josephson junction 201.

A resonance frequency of each qubit can be determined by an effective critical current of the qubit. Each qubit can be arranged such that a capacitance of the qubit is determined by an area of the superconductor islands and a number of the superconductor islands of the qubit and such that the capacitance of the qubit increases with the area and decreases with the number of superconductor islands.

For certain shapes, sizes, and numbers of superconductor islands, a target qubit capacitance can be achieved while a target degree of coupling between coupled qubits can also be achieved.

In some examples, control regions are not fully bounded by qubits. The control regions can be, for example, bounded on only one side by a qubit, with no qubits placed on other sides.

Various qubit designs are within the scope of this disclosure. The qubits can be, for example, Xmon qubits or transmon qubits. The qubits can be phase qubits, charge qubits, flux qubits, or hybridizations thereof. The qubits can include SQUIDs.

In some examples, each qubit includes a single superconductor island. In some examples, the first chip includes a superconductor ground plane, and a Josephson junction connects an island of a qubit (e.g., a qubit having a single island) to the superconductor ground plane, with the island of the qubit and the superconductor ground plane together forming a capacitor. The Josephson junction can be arranged to electromagnetically couple the superconductor island of a qubit to the superconductor ground plane.

Figure 3:
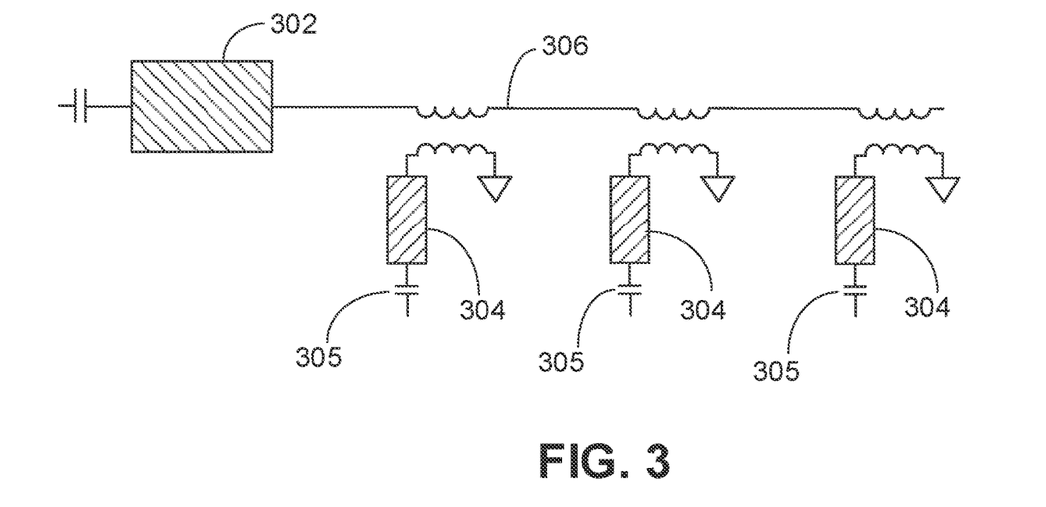
FIG. 3 is a schematic showing an exemplary qubit readout transmission line resonator.

An example of the qubit readout transmission line 118 of FIG. 1 is shown schematically in FIG. 3. A qubit readout transmission line 306 can be coupled to a filter 302, for example, a Purcell filter. The qubit readout transmission line 306 is also coupled to multiple qubit readout resonators 304 along the qubit readout transmission line 306, such that all qubits in a given qubit unit cell (e.g., a row or column of qubits) can be read out via the same qubit readout transmission line. By providing a single filter 302 for use with multiple qubit readout resonators 304, space that would otherwise have been used by filters may be made available for other quantum computing components. Providing a single filter 302 for use with multiple qubit readout resonators 304 may be accomplished by arranging the qubit readout resonators 304 to couple along a length of the common qubit readout transmission line 306. The qubit readout resonators 304 can couple to the qubit readout transmission line 306 via mutual inductances and/or capacitances.

Each of the qubit readout transmission line 306 and the qubit readout resonators 304 can include a shorted end coupled to a common ground and an opposite open end (represented by capacitor symbols 305). Each of the qubit readout resonators 304 can include, for example, a qubit readout pad, to which a corresponding qubit can be arranged to couple (see, e.g., readout pad 116 in FIG. 1). The coupling between a readout pad and a corresponding qubit can be, for example, electromagnetic. The coupling can be, for example, capacitive.

Each of the Purcell filter 302, the qubit readout resonators 304, and the qubit readout transmission line 306 may be implemented as a transmission line resonator, for example, a quarter-wave or half-wave superconductor co-planar waveguide resonator or strip-line resonator. Other resonator designs are also possible.

The qubit readout resonators 304 may be positioned along the qubit readout transmission line 306 such that a standing wave profile established in each qubit readout resonator 304 is matched to a standing wave profile established in the qubit readout transmission line 306. That is, the standing wave profile of each qubit readout resonator 304 is both impedance and phase matched to the standing wave profile of the qubit readout transmission line 306. Because the standing wave profile along the qubit readout transmission line 306 varies as a function of length, the coupling location along each qubit readout resonator 304 will also vary.

Each qubit readout resonator 304 can have a resonance frequency which can shift depending on the state of the qubit to which the qubit readout resonator 304 is coupled. The qubit readout transmission line 306 can be probed to determine the resonance frequencies of each of the qubit readout resonators 304 coupled to the line and thus the states of each of the qubits coupled to those qubit readout resonators 304.

The qubit readout resonators 304 and the qubit readout transmission lines 306 can include, for example, meandering portions. A length of each of the qubit readout resonators 304 and the qubit readout transmission lines 306 can determine a resonance frequency of each of the qubit readout resonators 304 and the qubit readout transmission lines 306. The Purcell filter 302 can be incorporated directly into the qubit readout transmission line 306, such that the qubit readout transmission line 306 itself functions as a Purcell filter 306.

As described above, the unit cell-based approach can allow each qubit in a qubit array to be addressed individually by control elements routed in from a perimeter of the array of qubits. Control elements (e.g., control wires) can have non-overlapping footprints to facilitate unit cell tiling. Control elements can have footprints that do not overlap footprints of qubit readout resonators. Each qubit can have individual XY- and Z-addressability.

Figure 4:
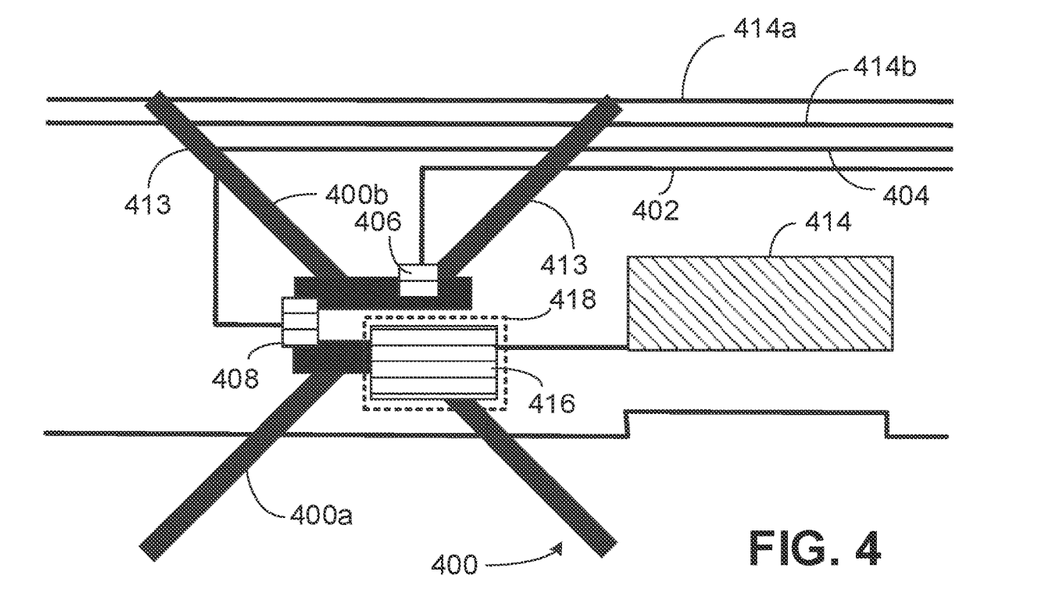
FIG. 4 is a schematic showing an exemplary qubit and associated control and readout components.

This is illustrated in the example of FIG. 4. A qubit 400 including two superconductor islands 400a, 400b can be coupled to two control lines 402, 404 via control contacts 406, 408. As described herein, the control contacts 406, 408 can be on the second chip directly over portions of the qubit 400. The control contacts 406, 408 can be on the first chip, for example, adjacent to portions of the qubit 400. Control lines 402, 404 connected respectively to the control contacts 406, 408, along with control lines 414a, 414b connected to another qubit (not shown) in the same qubit row as the qubit 400, can have footprints that overlap a footprint of the qubit 400. The control lines can have footprints that do not overlap a footprint of a qubit readout resonator 414, reducing interference and/or errors. The control lines 402, 404, 414a, 414b and qubit readout transmission line can be, for example, on the second chip and directly over one or more co-planar waveguide arms 413 of the qubit 400. Each control element can have a footprint that does not overlap a footprint of another control element. This can enable the tiling of unit cells, for example, qubit rows, because each control line can be routed in and/or out of each unit cell in a single respective plane, with less, or with no, out-of-plane 3D routing.

In some examples, control contacts are on the first chip, control lines are on the second chip, and each control contact is connected to a corresponding control line by a bump bond between the first chip and the second chip. The bump bond can be, for example, made of a superconductor material. In examples in which the control contacts are on the first chip, each control contact can be positioned adjacent to the qubit to which the control contact is arranged to electromagnetically couple. In examples in which the control contacts are on the first chip, a coupling between each control contact and the respective qubit to which the control contact is arranged to couple can be in-plane, with a direction of a coupling electric field and/or magnetic field being substantially in the plane of the first side of the first chip.

The first control line 402 and the control contact 406 connected to the first control line 402 can be, for example, an XY-control element. An XY-control element is operable to excite the qubit 400 to which the first control line 402 is coupled upon application of a control signal to the XY-control element. The control contact 406 that is part of the XY-control element 402, 406 can be, for example, on the second chip directly over one superconductor island 400b of the qubit 400.

The second control line 404 and the control contact 408 connected to the second control line 404 can be, for example, a Z-control element. A Z-control element is operable to tune an operating frequency of the qubit 400 to which the second control line 404 is coupled upon application of a control pulse to the Z-control element. The control contact 408 that is part of the Z-control element 404, 408 can be, for example, on the second chip directly over two superconductor islands 400a, 400b of the qubit 400.

As described above, the qubit readout resonator 414 can be connected to a readout pad 416. The qubit readout resonator 414, the readout pad 416, and the qubit 400 can be positioned so that, for example, the readout pad 416 is on the second chip directly over a readout region 418 of the qubit 400, and the qubit readout resonator 414 is on the second chip and not directly over the qubit 400. The qubit readout resonator 414 can be on the first chip within the footprint of a control region bounded in part by the qubit 400. The qubit readout resonator 414 can be, as described above, on the second chip directly over a control region bounded in part by the qubit 400. The qubit readout resonator 414 can be on the second chip directly over a superconductor ground plane formed on the first chip within a control region bounded in part by the qubit 400. Having the qubit readout resonator 414 be within a footprint of a control region bounded in part by the qubit 400 can reduce undesired coupling and/or interference and qubit errors, such as state leakage and unwanted qubit transitions, compared to a case in which the qubit readout resonator 414 is, for example, on the second chip directly over the qubit 400.

In examples in which the qubit readout resonators are on the first chip, a coupling between each qubit readout resonator and the respective qubit to which the qubit readout resonator is arranged to couple can be in-plane, with a direction of a coupling electric field and/or magnetic field being substantially in the plane of the first side of the first chip.

Figure 5A:
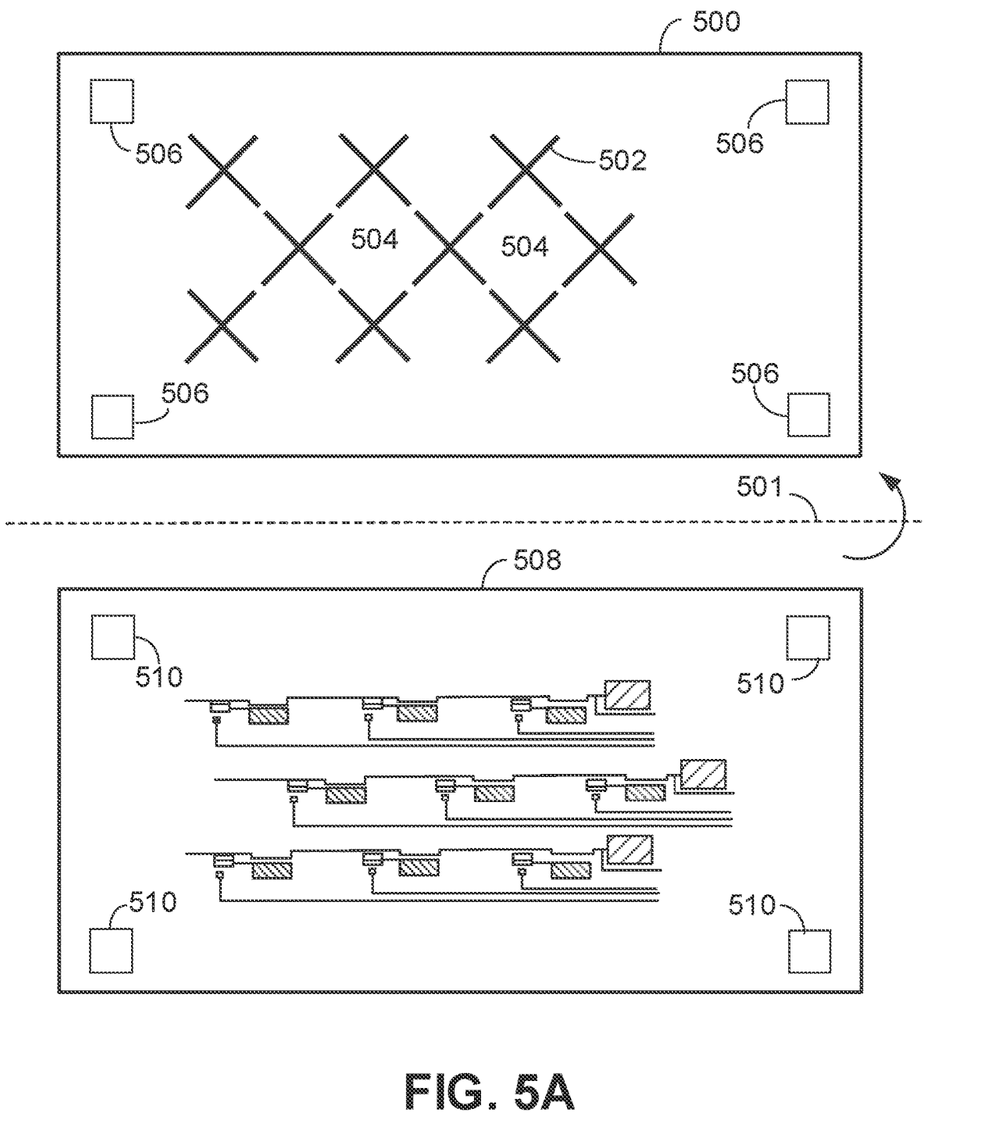
FIGS. 5A-5B are schematics showing an exemplary two-chip quantum processor.

Examples of the present disclosure can be implemented using a two-chip configuration, as shown in FIG. 5A. A first chip 500 includes qubits 502 arranged in a qubit array with qubit unit cells as described above for FIG. 1. The qubits 502 bound control regions 504 on the first chip 500. The first chip 500 can be made substantially of a dielectric substrate, for example, a silicon substrate or a sapphire substrate. The control regions 504 can include an exposed surface of the substrate. The first chip 500 can include a superconductor ground plane (not shown), and the qubits 502 can be superconductor islands on cutouts in the superconductor ground plane.

The first chip 500 can also include bonding elements 506 for bonding the first chip 500 to a second chip 508. The position and number of bonding elements 506 in FIG. 4 is an example. The first chip 500 can include fewer or more bonding elements 506 and the bonding elements 506 can be positioned differently than those shown in FIG. 4. In some examples, the bonding elements 506 include bump bonds.

The second chip 508 includes control lines, control contacts, qubit readout resonators, qubit readout transmission lines, readout pads, and filters, arranged as described above for FIG. 1. The second chip can include bonding elements 510 for bonding the second chip 508 to the first chip 500. The second chip 508 can be made substantially of a substrate on which the components of the second chip 508 are formed, including a dielectric substrate, such as silicon or sapphire. As described above, some of the components shown in FIG. 5A as being on the second chip 508 can, in some examples, be on the first chip 500.

The first chip 500 and the second chip 508 can be bonded to each other such that a side of the second chip 508 (on which the non-qubit components are arranged) faces a side of the first chip 500 (on which the qubits 500 are arranged). The bonding can be a flip-chip bonding. Axis 501 of FIG. 5A and the associated arrow serve as a visual guide for how to bond the first chip 500 and the second chip 508 to form a quantum processor.

As described above, when the two chips 500 and 508 are bonded together, the qubit readout resonators can be positioned directly over the control regions 504.

In some examples, readout pads, control contacts, and other components can be sized to allow for misalignments between chips. For example, referring back to FIG. 4, a surface area of the qubit 400 included in the readout region 418 can be less than a surface area of the readout pad 416 that is coupled to the qubit 400. For example, one or more dimensions (for example, a width) of the readout pad 416 can be enlarged to allow for a misalignment between the qubit 400 and the readout pad 416. That is, even if there is slight misalignment between the first chip 500 and the second chip 508, the magnitude of mutual coupling between the qubit readout resonator 414 and the qubit 400 remains substantially the same because the readout pad 416 is still aligned over a same area of the qubit 400. Alignment compensation can also be included in designs for the control contacts 406, 408 of FIG. 4. An example misalignment can be, for example, a few microns in a direction substantially parallel to a plane of a substrate of the first chip 500 and a substrate of the second chip 508.

Figure 5B:
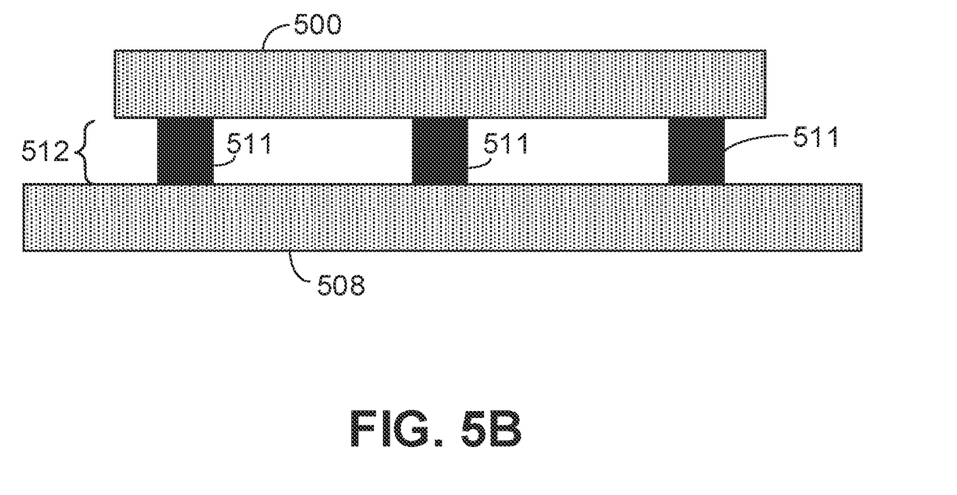

FIG. 5B shows a side view of the chips 500, 508 bonded together. Bonding elements 506, 510 of the two chips 500, 508 can be joined directly to each other, or bonding elements from each chip can directly contact portions of the other chip. After bonding, bump bonds 511 connect the two chips 500, 508 mechanically and/or electrically. The bump bonds 511 can include superconductor material to avoid energy loss and decoherence of qubits on the first chip 500. In some examples, the bump bonds can electrically connect components on the first chip 500 to components on the second chip 508. Suitable superconductor material for use as a bump bond 511 includes, but is not limited to, indium, lead, rhenium, palladium, or niobium having a thin layer of gold.

A thickness of the bump bonds 511 may be set so that the first chip 500 and the second chip 508 are spaced at a gap 512 apart. An approximate height of the gap 512 may be within an uncertainty based on the accuracy and/or precision limitations of the deposition technique(s) used to deposit and/or remove material to form the bump bonds 512 (and/or other components that may affect the distance) as well as of the metrology technique(s) with which the height of the gap 512 is measured. In some examples, the height of the gap 512 between the first chip 500 and the second chip 508 is at least 5 microns.

Figure 6A:
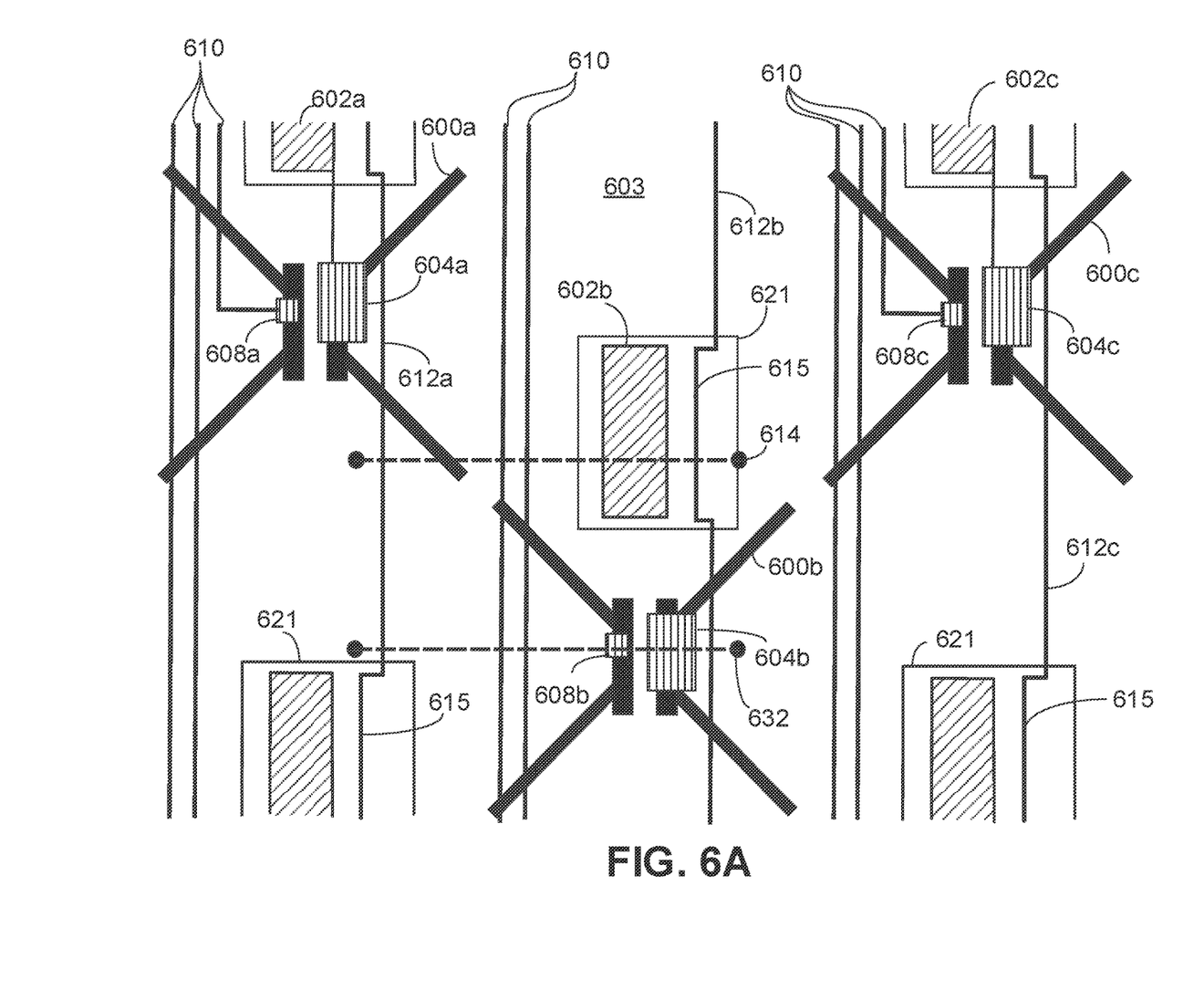
FIG. 6A is a schematic showing an exemplary quantum processor.

FIG. 6A shows a cropped portion of a quantum processor. Three qubits 600a, 600b, 600c are each in a different qubit row on a first chip. The qubits are couplable to corresponding qubit readout resonators 602a, 602b, 602c through readout pads 604a, 604b, 604c. Each qubit is couplable to a corresponding control contact 608a, 608b, 608c. Control lines 610 connect to the control contacts 608a, 608b, 608c, and qubit readout transmission lines 612a, 612b, 612c couple to the qubit readout resonators 602a, 602b, 602c. The qubits partially bound a control region 603 directly over which the qubit readout resonator 602b is positioned.

Figure 6B:
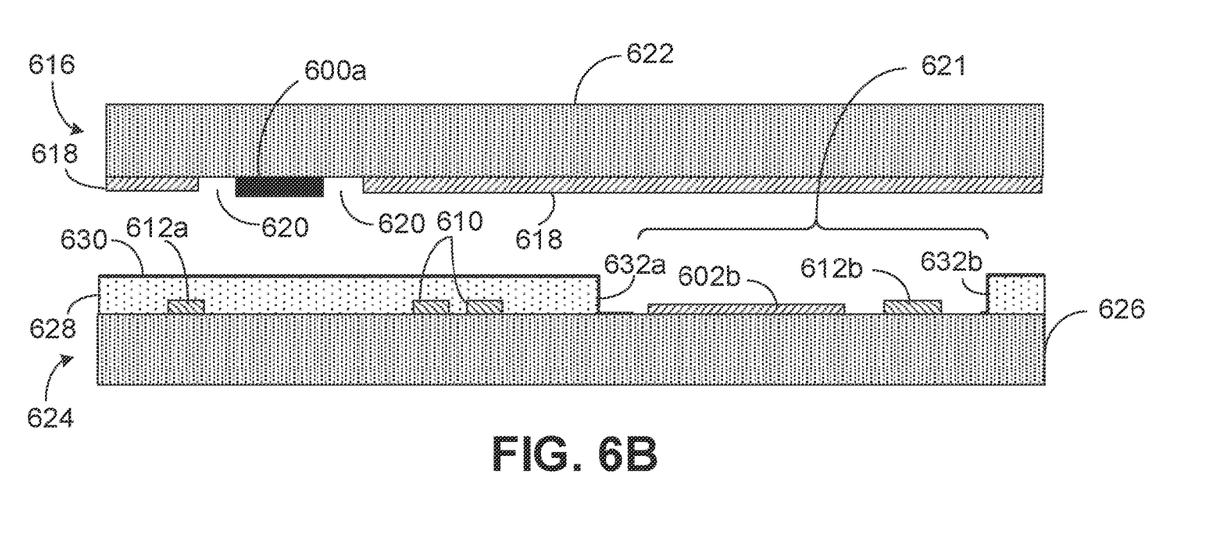
FIGS. 6B-6C are cross-sectional views of the quantum processor of FIG. 6A.

FIG. 6B shows a cross-sectional view along a first line 614 of FIG. 6A. A first chip 616 includes the qubit 600a. A surface of the first chip 616 also includes a superconductor ground plane 618. Gaps 620 separate the qubit 600b from the superconductor ground plane 618 on either side of the qubit 600b. The gaps 620 can include, for example, a bare surface of a substrate 622 of the first chip 616. The substrate 622 can be, for example, silicon or sapphire.

A second chip 624 includes a second substrate 626. The control lines 610 run along a surface of the second substrate 626 and are covered by a dielectric layer 628. The dielectric layer 628 may include lossy dielectrics, such as tetraethyl orthosilicate (TEOS), silicon dioxide, or silicon nitride. A lossy dielectric material is a dielectric material with a loss tangent at microwave frequencies (between about 1 and about 10 GHz) that is below about 1e-6. The lossy dielectric material may be deposited, for example, using a plasma deposition process. A thickness of a deposited dielectric material can range between about 50 nm and about 2000 nm.

Each qubit readout transmission line 612a, 612b, 612c includes coupling regions 615 that are adjacent to corresponding portions of the qubit readout resonators 602a, 602b, 602c. Openings in the dielectric layer 628 expose the coupling regions 615. The coupling region 615 can couple to the qubit readout resonator 602b, a coupling that might be more lossy and/or noisy if the dielectric layer 628 and the shielding layer 630 were disposed between the coupling region 615 and the qubit readout resonator 602b or on top of the coupling region 615 and/or the qubit readout resonator 602b. The coupling region 615 might be closer to the qubit readout resonator 602b than are other portions of the qubit readout transmission line 612b. Other regions of the second chip 624 can also be exposed by openings in the dielectric layer 628. Marked areas 621 show some portions of the second chip 624 that are not covered by the dielectric layer 628, but other portions can also be exposed, for example, the portions indicated below in reference to FIGS. 6B-6C.

In some examples, control lines can be embedded entirely within the dielectric layer 628. In some examples, control lines can be embedded in multiple levels of the dielectric layer 628. In some examples, vertical connectors can connect control lines across multiple levels of the dielectric layer 628.

A shielding layer 630 covers the dielectric layer 628. The shielding layer 630 can include a superconductor material, such as aluminum. The shielding layer 630 can block fields from the qubits and control and qubit readout transmission lines from interfering with one another. Such interference may cause the superconducting qubits to dampen and decohere. In some examples, a surface of the dielectric layer 628 is completely covered by the shielding layer 630, including the sidewalls of the dielectric layer 628 (for example, sidewalls 632a and 632b), effectively encapsulating the surface of the dielectric layer 628 that is not formed on the substrate. A thickness of a superconductor shielding layer 630 can range from about 10 nm to about 1000 nm.

FIG. 6B also shows the qubit readout resonator 602b and the qubit readout transmission line 612b. The qubit readout resonator 602b is not covered by the dielectric layer 628 and shielding layer 630. This is because the dielectric layer 628 may lead to a low intrinsic quality factor $Q_i$ for the qubit readout resonator 602b, and thus coherence that is too low for the qubit readout resonator 602b to function properly. For example, the qubit readout resonator 602b might damp the qubit 600b if the qubit readout resonator 602b is covered by the dielectric layer 628. To preserve the coherence of the qubit readout resonator 602b, the dielectric layer 628 is not provided on the qubit readout resonator 602b.

As described above, the qubit readout resonator 602b is directly over the control region 603 without being positioned directly over the qubit 600b. As described above, this positioning can reduce undesired coupling and/or interference and qubit errors, such as state leakage and unwanted qubit transitions, compared to a case in which the qubit readout resonator 602b is directly over the qubit 600b.

The coupling region 615 of the qubit readout transmission line 612b shown in FIG. 6B is also not covered by the dielectric layer 628. This can allow coupling (for example, inductive coupling and/or capacitive coupling) between the qubit readout transmission line 612b and the qubit readout resonator 602b that otherwise would be blocked by the dielectric layer 628 and the shielding layer 630. The area 621 on the second chip between and/or surrounding the coupling region 615 of the qubit readout transmission line 612b and the qubit readout resonator 602b can also be uncovered by the dielectric layer 628, which may preserve coherence and/or reduce noise in the qubit readout resonator 602b.

Figure 6C:
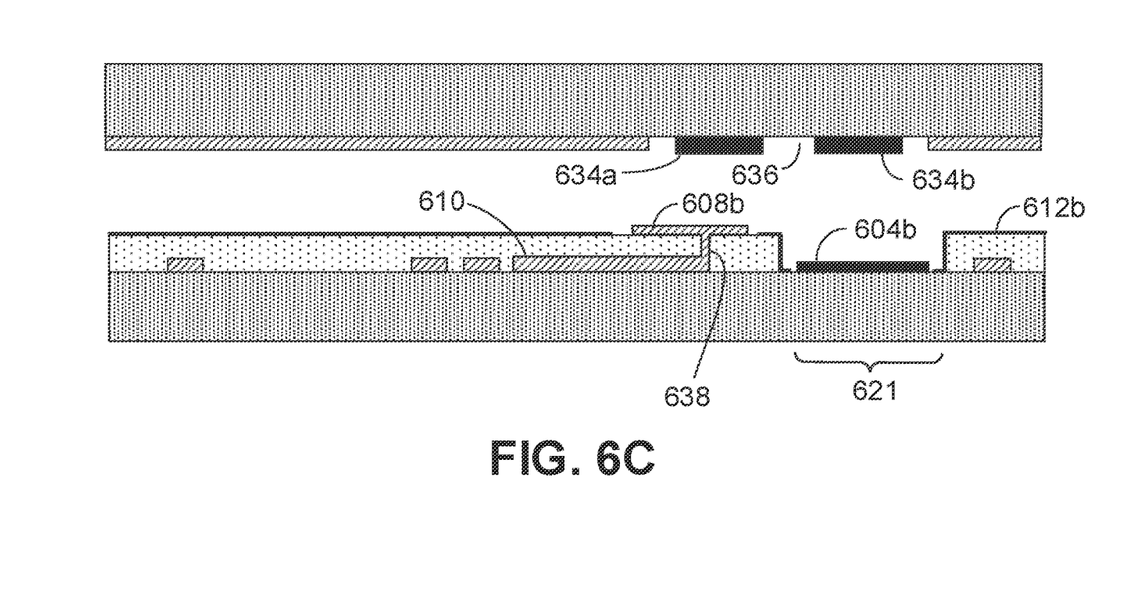

Portions of the qubit readout transmission line 612b that do not couple directly to a qubit readout resonator (for example, the portion of the qubit readout transmission line 612b shown in FIG. 6C) can be covered by the dielectric layer 628 and the shielding layer 630.

FIG. 6C shows a cross-sectional view along a second line 632 of FIG. 6A. On the first chip 616, two superconductor islands 634a, 634b of the qubit 600b have a gap 636 between them. As described above, sizes and shapes of the superconductor islands 634a, 634b, a width of the gap 636, and other design parameters can set a total capacitance of the qubit 600b.

On the second chip 624 in FIG. 6C, a control line 610 is connected to a control contact 608b by a vertical connector 638 that goes through the dielectric layer 628. The control contact 608b is not covered by the dielectric layer 628 or the shielding layer 630. This can allow the control contact 608b to couple (for example, couple inductively and/or capacitively) to the qubit 600b and thereby perform, for example, XY-control or Z-control upon application of an appropriate pulse to the control line 610 connected to the control contact 608b.

The readout pad 604b is also not covered by the dielectric layer 628. The readout pad 604b can couple to the qubit 602b, as described above, and be used to read out the state of the qubit 602b.

The portion of the qubit readout transmission line 612b shown in FIG. 6C is covered by the dielectric layer 628 and the shielding layer 630. This is because the portion of the qubit readout transmission line 612b shown in FIG. 6C is not the coupling region 615 that couples to the qubit readout resonator 602b.

The example of FIGS. 6A-6C illustrates how features of this disclosure can enable a unit cell-based tiled quantum processor. The dielectric layer and the shielding layer enable efficient use of space by allowing control lines to be routed with footprints overlapping qubit footprints. Openings in the dielectric layer enable coupling and high-quality resonance. Control components and readout components for the qubits of a given unit cell are routed within the footprint of the unit cell, such that components for different unit cells do not overlap and such that additional unit cells may be added to an existing quantum processor design.

In some examples, the first chip can include a dielectric layer and a shielding layer. In some examples, components including the qubit readout resonators and the control contacts are on the first chip and are exposed through openings defined in the dielectric layer of the first chip. In some examples, the qubit readout resonators are on the first chip, and a superconductor ground plane is on the second chip, and the superconductor ground plane is directly over the qubit readout resonators.

Control elements, qubit readout transmission lines, qubits, qubit readout resonators, readout pads, and other components and wires can be made of a superconductor material, such as aluminum, niobium, or titanium nitride, among other superconductor materials.

Quantum circuit components (also referred to as quantum computing circuit components) include circuit components for performing quantum processing operations. That is, the quantum circuit components are configured to make use of quantum-mechanical phenomena, such as superposition and entanglement, to perform operations on data in a non-deterministic manner. Certain quantum circuit components, such as qubits, can be configured to represent and operate on information in more than one state simultaneously. Examples of superconducting quantum circuit components include circuit elements such as quantum LC oscillators, qubits (e.g., flux qubits, phase qubits, or charge qubits), and superconducting quantum interference devices (SQUIDs) (e.g., RF-SQUID or DCSQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit components through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

In certain cases, some or all of the quantum and/or classical circuit elements may be implemented using, e.g., superconducting quantum and/or classical circuit elements. Fabrication of the superconducting circuit elements can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit components and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of 1.2 kelvin) and niobium (superconducting critical temperature of 9.3 kelvin). Accordingly, superconducting structures, such as superconducting traces and superconducting ground planes, are formed from material that exhibits superconducting properties at or below a superconducting critical temperature.

In certain implementations, control signals for the quantum circuit components (e.g., qubits and qubit couplers) may be provided using classical circuit elements that are electrically and/or electromagnetically coupled to the quantum circuit components. The control signals may be provided in digital and/or analog form.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A device comprising an array of unit cells comprising a plurality of unit cells, each unit cell of the plurality of unit cells comprising:
   a plurality of qubits,
   a plurality of qubit control elements arranged to control the plurality of qubits,
   a plurality of qubit readout resonators arranged to read out the plurality of qubits, and
   a qubit readout transmission line arranged to electromagnetically couple to the plurality of qubit readout resonators,
   wherein the plurality of qubit control elements of each unit cell of the plurality of unit cells have non-overlapping footprints with respect to footprints of the plurality of qubit control elements of other unit cells of the plurality of unit cells.

2. The device of claim 1, wherein, for each pair of adjacent unit cells of the plurality of unit cells, the pair of adjacent unit cells are arranged such that qubits of a first unit cell of the pair of adjacent unit cells are offset relative to qubits of a second unit cell of the pair of adjacent unit cells.

3. The device of claim 1, wherein the plurality of unit cells are tiled adjacent to one another in a row.

4. The device of claim 1, wherein the plurality of qubit control elements of each unit cell of the plurality of unit cells have non-overlapping footprints with respect to footprints of the qubit readout transmission lines of other unit cells of the plurality of unit cells.

5. The device of claim 1, wherein the plurality of qubit control elements of each unit cell of the plurality of units cells have non-overlapping footprints with respect to footprints of the plurality of qubit readout resonators of the unit cell.

6. The device of claim 1, comprising a first chip and a second chip,
   wherein, for each unit cell of the plurality of unit cells, the plurality of qubits of the unit cell are disposed on a first side of the first chip, and
   wherein at least one of the plurality of qubit control elements of the unit cell, at least one of the plurality of qubit readout resonators of the unit cell, the qubit readout transmission line of the unit cell, or a combination thereof, are disposed on a first side of the second chip, and
   wherein the first side of the first chip faces the first side of the second chip.

7. The device of claim 1, wherein, for each unit cell of the plurality of unit cells, each qubit of the plurality of qubits of the unit cell is arranged to electromagnetically couple to at least one qubit from an adjacent unit cell.

8. A device comprising
   an array of unit cells comprising a plurality of unit cells tiled adjacent to one another in a first direction, such that the array of unit cells is bounded by a first edge and a second edge opposite the first edge, wherein the first edge and the second edge are parallel to the first direction,
   each unit cell of the plurality of unit cells comprising:
      a plurality of qubits,
      a plurality of qubit control elements arranged to control the plurality of qubits, the plurality of qubit control elements comprising one or more control lines,
      a plurality of qubit readout resonators arranged to read out the plurality of qubits, and
      a qubit readout transmission line arranged to electromagnetically couple to the plurality of qubit readout resonators,
   wherein the one or more control lines of each unit cell and the qubit readout transmission line of each unit cell enter the unit cell via the first edge or the second edge.

9. The device of claim 8, wherein the array of unit cells is bounded by a third edge orthogonal to the first edge and the second edge, and
   wherein, based on the one or more control lines of each unit cell and the qubit readout transmission line of each unit cell entering the unit cell via the first edge or the second edge, edges between unit cells of the plurality of unit cells, the third edge is available for placement of an additional unit cell adjacent to the third edge.

10. The device of claim 8, wherein, for each pair of adjacent unit cells of the plurality of unit cells, the pair of adjacent unit cells are arranged such that qubits of a first unit cell of the pair of adjacent unit cells are offset relative to qubits of a second unit cell of the pair of adjacent unit cells.

11. The device of claim 8, wherein, for each unit cell of the plurality of unit cells, each qubit of the plurality of qubits of the unit cell is arranged to electromagnetically couple to at least one qubit from an adjacent unit cell.

12. The device of claim 8, wherein the one or more control lines of each unit cell and the qubit readout transmission line of each unit cell are routed to a periphery of a chip on which the one or more control lines and the qubit readout transmission line are formed.

13. The device of claim 8, comprising a first chip and a second chip,
   wherein, for each unit cell of the plurality of unit cells, the plurality of qubits of the unit cell are disposed on a first side of the first chip, and
   wherein at least one of the plurality of qubit control elements of the unit cell, at least one of the plurality of qubit readout resonators of the unit cell, the qubit readout transmission line of the unit cell, or a combination thereof, are disposed on a first side of the second chip, and
   wherein the first side of the first chip faces the first side of the second chip.

* * * * *